US009291129B2

(12) United States Patent
Robinson

(10) Patent No.: US 9,291,129 B2
(45) Date of Patent: Mar. 22, 2016

(54) METHOD AND APPARATUS FOR ADDRESSING BLOW-BACK WHEN HYDROGEN GENERATORS ARE ATTACHED TO COMBUSTION ENGINES TO ENHANCE PERFORMANCE

(71) Applicant: Empire Hydrogen Energy Systems Inc., Sidney (CA)

(72) Inventor: Kenneth Wayne Robinson, Sidney (CA)

(73) Assignee: Empire Hydrogen Energy Systems Inc., Sidney, British Columbia (CA)

( * ) Notice: Subject to any disclaimer, the term of this patent is extended or adjusted under 35 U.S.C. 154(b) by 202 days.

(21) Appl. No.: 13/962,012

(22) Filed: Aug. 8, 2013

(65) Prior Publication Data
US 2014/0041347 A1      Feb. 13, 2014

(30) Foreign Application Priority Data

Aug. 9, 2012   (CA) .................................... 2785780

(51) Int. Cl.
| | |
|---|---|
| *F02M 35/024* | (2006.01) |
| *B01D 46/24* | (2006.01) |
| *B01D 46/30* | (2006.01) |
| *F02M 35/10* | (2006.01) |
| *F02M 25/12* | (2006.01) |
| *B01D 46/00* | (2006.01) |

(52) U.S. Cl.
CPC ..... *F02M 35/02458* (2013.01); *B01D 46/0093* (2013.01); *B01D 46/2403* (2013.01); *B01D 46/30* (2013.01); *F02M 35/02483* (2013.01); *F02M 35/10275* (2013.01); *B01D 46/003* (2013.01); *F02M 25/12* (2013.01); *F02M 35/02408* (2013.01); *Y02T 10/121* (2013.01); *Y10T 29/49229* (2015.01)

(58) Field of Classification Search
CPC .. B01D 39/02; B01D 46/003; B01D 46/0093; B01D 46/2403; B01D 46/2411; F02M 35/02458; F02M 35/02483; F02M 35/02404; F02M 35/10275
USPC ....................... 55/515, 516, 517, 482; 96/134
See application file for complete search history.

(56) References Cited

U.S. PATENT DOCUMENTS

| | | | |
|---|---|---|---|
| 5,143,025 A | 9/1992 | Munday | |
| 5,531,199 A | 7/1996 | Bryant et al. | |
| 7,763,104 B2 * | 7/2010 | Arruda et al. | ................... 96/134 |
| 2001/0040136 A1 * | 11/2001 | Wei et al. | ....................... 210/767 |
| 2010/0089368 A1 * | 4/2010 | Hirata et al. | ................. 123/518 |

* cited by examiner

*Primary Examiner* — Robert Clemente
(74) *Attorney, Agent, or Firm* — Davis & Bujold, P.L.L.C.; Michael J. Bujold

(57) ABSTRACT

A method and associated apparatus are described for addressing blow-back when a hydrogen generator is attached to a combustion engine to enhance performance. The method involves positioning a filter with a porous flame tolerant core upstream of the combustion engine on a supply line leading from the hydrogen generator to the combustion engine. The method also involves surrounding the porous flame tolerant core with a hydrophilic filter medium. The hydrophilic filter medium serves as a trap for water vapor passing through the filter in a first direction and the hydrophilic filter medium moistened by water vapor assists in retarding flames passing through the filter in a second direction.

5 Claims, 2 Drawing Sheets

METHOD AND APPARATUS FOR ADDRESSING BLOW-BACK WHEN HYDROGEN GENERATORS ARE ATTACHED TO COMBUSTION ENGINES TO ENHANCE PERFORMANCE

FIELD

There is discussed a method and associated apparatus for addressing blow-back when hydrogen generators are attached to combustion engines to enhance performance.

BACKGROUND

A method of enhancing performance of a combustion engine involves using a hydrogen generator to generate HHO. When HHO is mixed with the air-fuel mixture, the fuel burns cleaner and more torque is generated. However, should the engine backfire, there is a danger that hydrogen gas which has ignited by the backfiring engine will proceed backwards through the hydrogen generator. The resulting explosion can potentially damage the vehicle and injure any occupants. U.S. Pat. No. 5,531,199 (Bryant et al) discloses the use of a blow-back valve to address this concern. There will hereinafter be described an alternative method and associated apparatus for addressing blow-back.

SUMMARY

According to one aspect there is provided a method for addressing blow-back when a hydrogen generator is attached to a combustion engine to enhance performance. The method involves positioning a filter with a porous flame tolerant core upstream of the combustion engine on a supply line leading from the hydrogen generator to the combustion engine. The method also involves surrounding the porous flame tolerant core with a hydrophilic filter medium. The hydrophilic filter medium serves as a trap for water vapour passing through the filter in a first direction and the hydrophilic filter medium moistened by water vapour assists in retarding flames passing through the filter in a second direction.

According to another aspect there is provided a filtration apparatus which includes a body having an internal barrier defining a central cavity surrounded by and in fluid communication with an outer cavity. An HHO outlet is in fluid communication with the central cavity and an HHO inlet is in fluid communication with the outer cavity. A porous flame tolerant core is positioned in the central cavity. A hydrophilic filter medium is positioned in the outer cavity.

Although beneficial results may be obtained through the use of the method and apparatus described above, better results are obtained if means are provided to limit penetration of flames into the body of the filtration apparatus. This can be accomplished by positioning a flame diffusion screen across the HHO outlet.

Although there are various porous flame tolerance core material that could be used, it has been found that a relatively simple and inexpensive manner of creating a porous flame tolerant core is to fill the central cavity with glass or ceramic beads.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
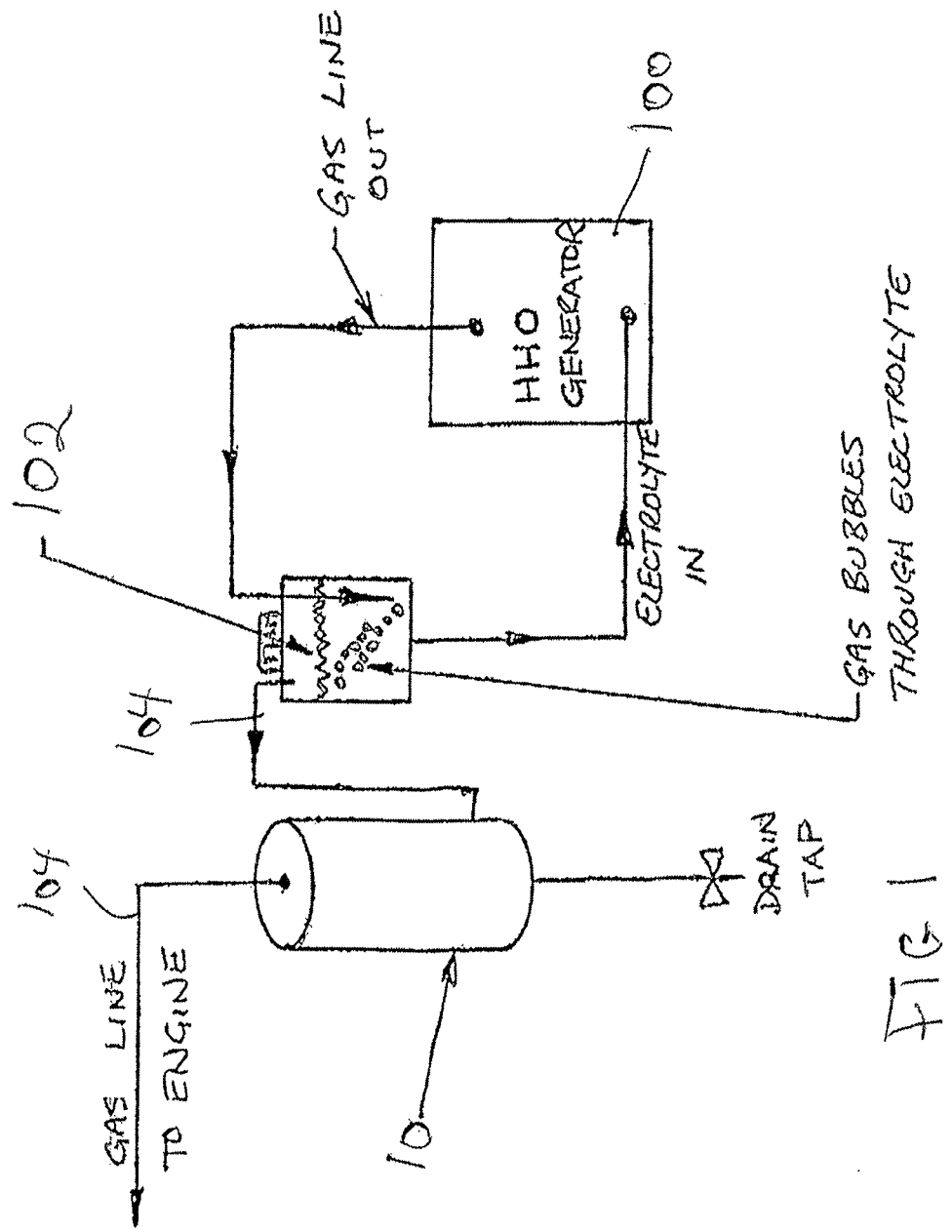
FIG. 1 is a schematic drawing of a combustion engine modified by the addition of a hydrogen generator in accordance with the teachings of the method.
Figure 2:
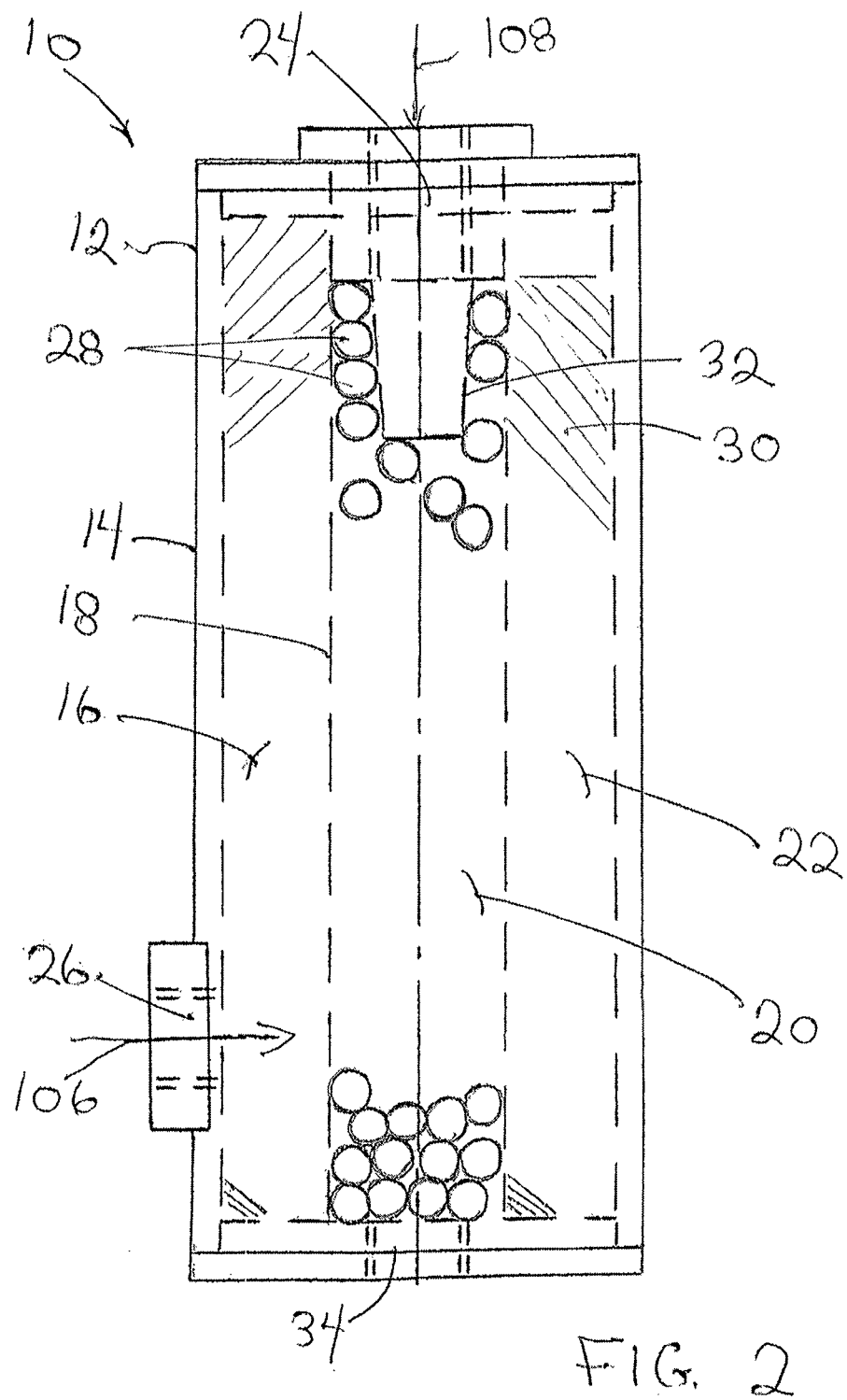
FIG. 2 is a side elevation view, in section, of a filtration apparatus developed in accordance with the teachings of the method.

A filtration apparatus, generally identified by reference numeral 10, will now be described with reference to FIGS. 1 and 2, along with a method that uses filtration apparatus 10 for addressing blow-back when a hydrogen generator is attached to a combustion engine to enhance performance.
Structure and Relationship of Parts:

Referring to FIG. 2, filtration apparatus 10 includes a body 12 having an external sidewall 14 that defines an interior cavity 16. Within interior cavity 16 there is an internal barrier 18 that divides interior cavity 16 into two portions: a central cavity 20 and an outer cavity 22 this surrounds central cavity 20. Central cavity 20 is in fluid communication with outer cavity 22. Body 12 has an HHO outlet 24 in fluid communication with central cavity 20 and an HHO inlet 26 in fluid communication with outer cavity 22. Glass or ceramic beads 28 are positioned in the central cavity 20 and serve as a porous flame tolerant core. A hydrophilic filter medium 30 is positioned in outer cavity 22. Preferably, a flame diffusion screen 32 made out of sintered bronze is positioned across HHO outlet 24. A drain 34 is provided to periodically drain filtration apparatus 10 of accumulated moisture.
Operation:

There will now be described a method for using filtration apparatus 10 to address blow-back when a hydrogen generator is attached to a combustion engine to enhance performance. Referring to FIG. 1, there is illustrated a hydrogen generating system that includes an HHO generator 100 and an electrolyte tank 102. There is an output line 104 from electrolyte tank 102 leading to a combustion engine. Filtration apparatus 10 is placed on output line 104. Referring to FIG. 2, during the course of normal operation, HHO produced is output into output line 104 and passes into HHO inlet 26, where is must pass through outer cavity 22 to reach HHO outlet 24. Hydrophilic filter medium 30 serves as a trap that removes water vapour from HHO gas passing through filtration apparatus 10 in a first direction, as indicated by arrow 106. As will be apparent, during operation hydrophilic filter medium 30 is kept moist by water vapour. Should a blow-back event occur with flames from ignited HHO migrating back along output line 104, glass or ceramic beads 28 positioned in central cavity 20 slow migration of the flames and the moisture retained in hydrophillic filter medium 30 assists in retarding flames moving in a second direction, as indicated by arrow 108. Although filtration apparatus is capable of operating in the absence of flame diffusion screen 32, it is strongly recommended that flame diffusion screen 32 be added. Flame diffusion screen 32 serves to spread the flames laterally and limit a depth of their penetration into central cavity 20, making them easier to extinguish.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method for addressing blow-back when a hydrogen generator is attached to a combustion engine to enhance performance, comprising:
   positioning a filter with a porous flame tolerant core upstream of the combustion engine on a supply line leading from the hydrogen generator to the combustion engine;
   surrounding the porous flame tolerant core with a hydrophilic filter medium, the hydrophilic filter medium providing a trap for water vapour passing through the filter in a first direction and the hydrophilic filter medium moistened by water vapour assisting in retarding flames passing through the filter in a second direction.

2. The method of claim 1, wherein the porous flame tolerant core is comprised of glass or ceramic beads.

3. The method of claim 1, wherein a flame diffusion screen is positioned across an HHO outlet in communication with the flame tolerant core.

4. A filtration apparatus, comprising:
   a body having an internal barrier defining a central cavity surrounded by and in fluid communication with an outer cavity, an HHO outlet in fluid communication with the central cavity and an HHO inlet in fluid communication with the outer cavity;
   a porous flame tolerant core positioned in the central cavity;
   a flame diffusion screen positioned across the HHO outlet; and
   a hydrophilic filter medium positioned in the outer cavity.

5. The filtration apparatus of claim 4, wherein the porous flame tolerant core is comprised of glass or ceramic beads.

* * * * *